May 20, 1941.　　　　P. L. DULANEY　　　　2,242,669
SPACE HEATER
Filed Oct. 31, 1939　　　　3 Sheets-Sheet 1

Inventor
PAUL L. DULANEY
by
Attorneys

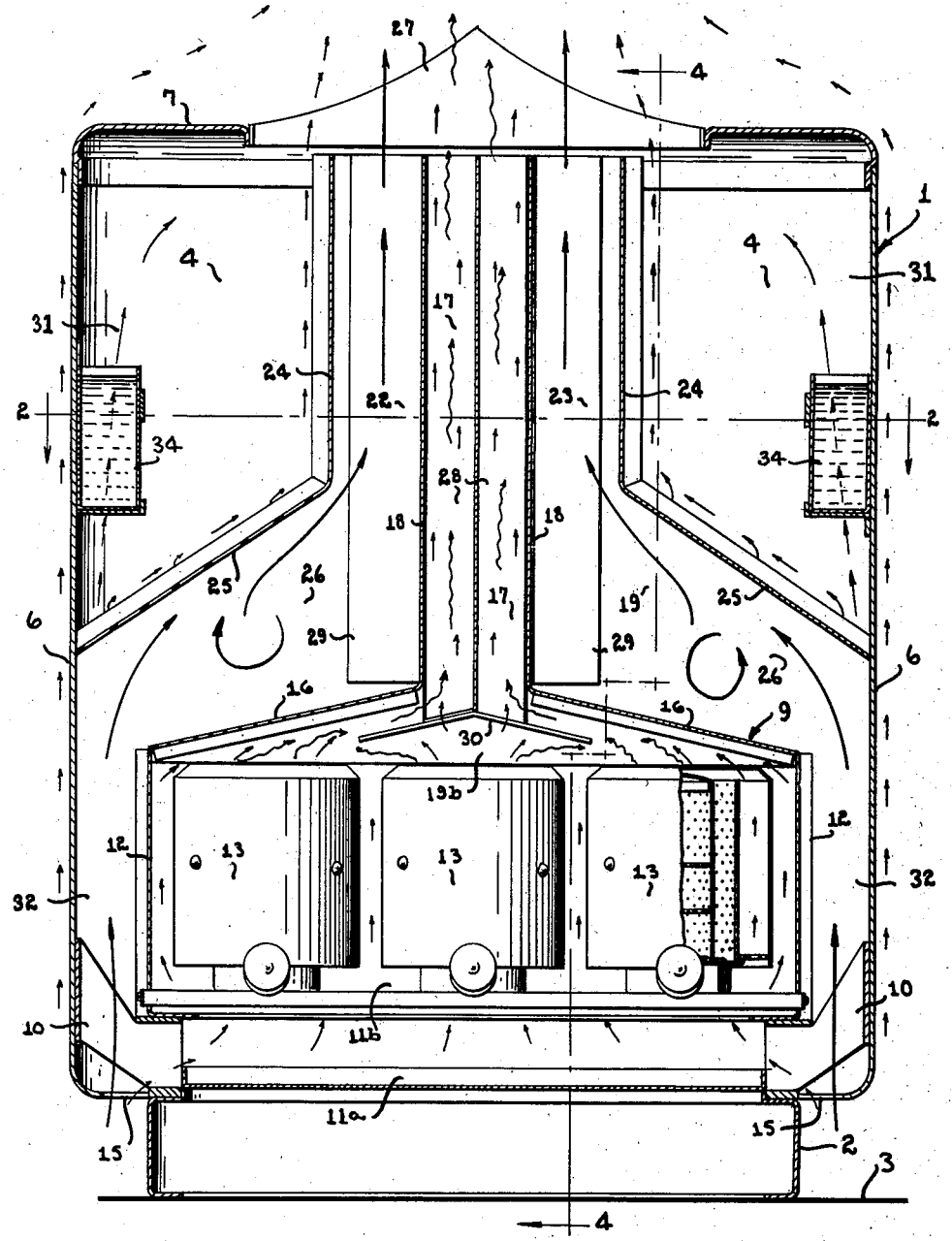

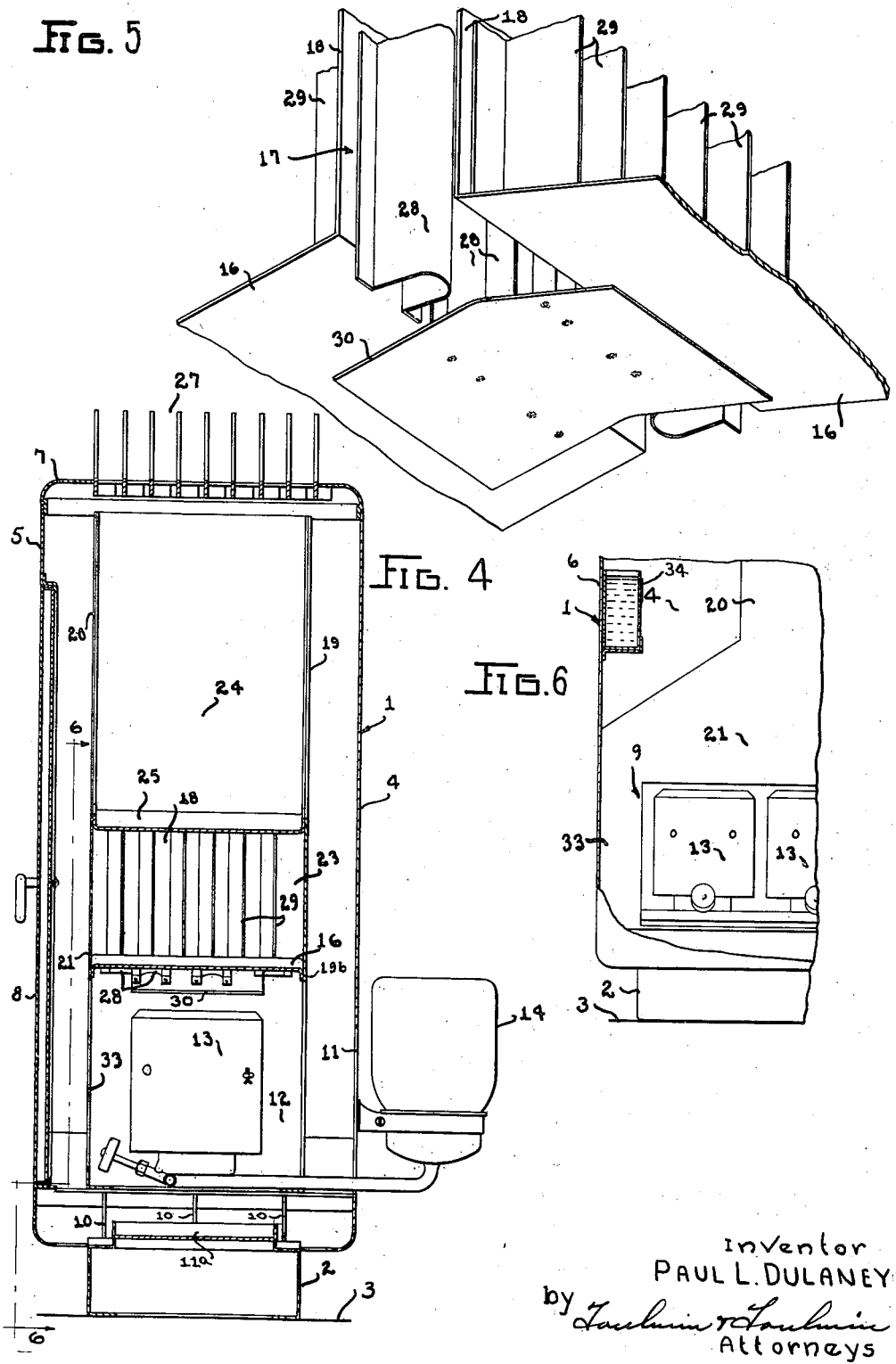

Patented May 20, 1941

2,242,669

UNITED STATES PATENT OFFICE 2,242,669

SPACE HEATER

Paul L. Dulaney, Cincinnati, Ohio, assignor to The Huenefeld Company, Cincinnati, Ohio, a corporation of Ohio Application October 31, 1939, Serial No. 302,257

13 Claims. (Cl. 126—93)

This invention relates to a space heater, that is, a heater which is particularly adapted to the heating of an enclosure such as a room or the like. The heater is of the so-called "flueless" type, that is the heated air from the burners is all discharged into the room, no outdoor flue being provided. The heater of this invention makes possible a faster circulation of the air in the room or space to be heated, and thereby a quicker heating of the same to the comfort stage, with the attendant advantage of a more uniform temperature throughout the space or enclosure being heated. These results are accomplished without the use of a fan.

The principal object of the present invention is to devise a space heater which is particularly adapted to rapidly circulate the air in the enclosure and to rapidly impart a desired degree of heat uniformly thereto, by gathering the air currents which normally surround a space heater and concentrate them towards a central zone which is intensely heated, thereby imparting to them a relatively high velocity for dissipation into the space being heated.

It is an object of the invention to provide a space heater for circulating air therethrough arranged in such a manner that the air, which is heated within the space heater absorbs the heat from the products of combustion of the heating means, will be circulated upwardly through the space heater and discharge into the space being heated, whereby the heating effect of the heated air as well as the heat of the products of combustion can be used for heating a space.

It is a further object of the invention to provide a space heater wherein air rising through the heater, due to expansion thereof upon being heated, will pass through a plurality of parallel channels whereby a greater efficiency of heating will be obtained since the total quantity of air passed through the heater may take separate channels for heating and thereby absorb heat from the space heater over a greater surface area.

It is a further object of the invention to provide a space heater wherein a plurality of air passageways are arranged in a manner that the air passing through the passageways will circulate through the heater in substantially parallel relation.

Another object of the invention is to provide a space heater wherein air entering the heater for heating purposes will have the velocity thereof slowed down upon entering the heater, whereby the air may be more intensely heated than if the velocity thereof was retained constant throughout its passage through the heater.

It is a still further object of the invention to provide a space heater wherein the air entering the heater for heating purposes may be slowed down upon entering the heater to permit the air to absorb a greater amount of heat after which the passage of the air through the heater will be restricted to increase the velocity thereof in order to produce a high velocity air stream discharging from the heater casing whereby greater efficiency of circulation within the space being heated will be obtained.

Another object of the invention is to provide a space heating device wherein the air may be circulated through a plurality of substantially parallel passageways, and wherein the passageways are finned so as to produce increased surface area for heating purposes and to direct the flow of gases through the respective passageways in a manner to obtain the greatest heat absorption from the fins.

Still another object is to provide a device of the foregoing type wherein still other fresh air currents are drawn into intimate admixture with the high speed blast issuing from the device, and are thence dispersed throughout the space being heated.

Another object is to provide a device of the foregoing type wherein the flue from the burner compartment has U-shaped internal fins forming vertical passageways and the exterior of the flue has flat vertical fins located within the chimney and adapted to communicate heat to the fresh air currents which are passing upwardly around the flue at a relatively high speed.

Other objects of the present invention will more fully hereinafter appear.

Referring to the accompanying drawings:

Figure 3 is a vertical section on the plane 3—3 of Figure 1, looking in the direction of the arrows.

Figure 4 is a vertical section on the line 4—4 of Figure 3, looking in the direction of the arrows.

Figure 5 is a bottom perspective of a portion of the flue, and of the baffle mounted therebelow.

Figure 6 is a partial section on the line 6—6 of Figure 4, looking in the direction of the arrows.

Figure 1:
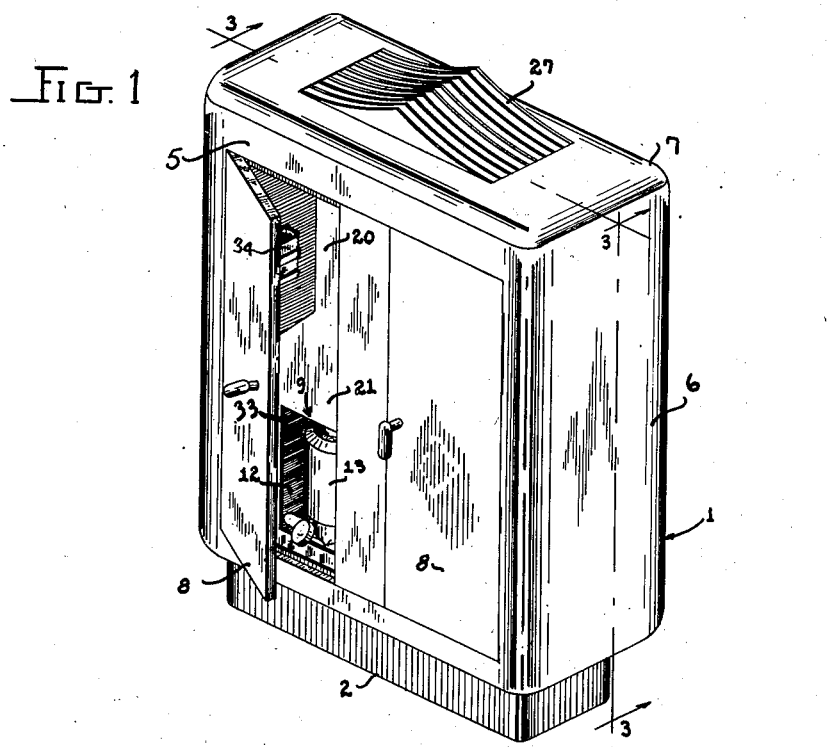
Figure 1 is a perspective view of one form of the present invention with one of the doors partly opened so as to illustrate the general positioning of the several parts.

The device of the present invention is particularly useful for the heating of a room or other enclosure with burners of the kerosene type more rapidly than room heaters heretofore employed. The device of the present invention provides more rapid circulation of the heat by more rapidly circulating the heated air issuing from the burners and by causing secondary fresh air to issue from the device at relatively high velocity after it has taken up a substantial amount of the heat liberated by the burners, and thereafter to commingle with the partially cooled air from the burners and to rapidly circulate throughout the enclosure. The present invention provides better heating by circulating the air in the room more rapidly, thereby bringing the room to the comfort stage more quickly and maintaining the temperature of the room more uniform throughout the room.

Referring to the drawings in detail, reference numeral 1 designates generally a rectangular sheet metal casing which forms an enclosure for the burners, the chimney, the flue and the associated mechanism. Casing 1 is attached to a support 2 which is adapted to rest upon the floor 3 of the enclosure and to support the casing and its associated parts above the floor line, say two or more inches, for a purpose which will hereinafter appear. The casing 1 has a back 4, a front 5, sides 6 and a top 7. The front 5 is provided with two outwardly opening doors of any suitable type which are adapted to provide access to the burners for lighting the same. The back 4 is open at its lower portion as indicated at 11.

Figure 2:
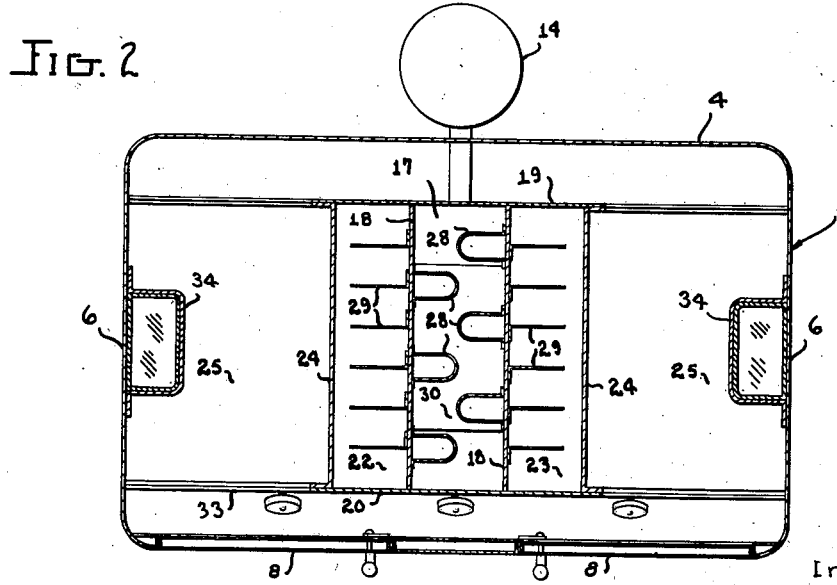
Figure 2 is a horizontal section on the line 2—2 of Figure 3, looking in the direction of the arrows.

Disposed within the casing 1 is a burner compartment designated generally as 9 which is spaced inwardly of the sides 6 and of the bottom of casing 1 by supporting members 10, as shown in Figures 1, 2 and 4. This burner compartment is also spaced inwardly from the back 4 and the front 5 of the casing for a purpose which will presently appear. Burner compartment 9 has sides 12 and is open at the front and back to leave a clear air space to the burners, provide ready access to the burners and to allow them to be removed if desired; the bottom of the burner compartment 9 is also open to allow air for combustion to pass upwardly into the burners. A drip pan 11a to catch drip and matches, etc. is provided over the upper portion of support 2 and below the bottom of the burner compartment.

Mounted in any suitable manner lengthwise of burner compartment 9 are three burners 13 which are preferably of the usual kerosene oil burner type and which are fed with fuel from an oil tank 14 mounted behind the casing 1. The construction of the burners themselves is not a part of the present invention, since their construction is well known in the art. Therefore, they are not described in detail. Air enters the burners at their bottom and passes upwardly through them, supporting combustion in the burners and the heated combustion products together with any unused air pass outwardly through the top of the burners and upwardly. Air enters casing 1 through rear opening 11 and through an annular passageway 15 which is formed around the margin of the bottom of the casing 1, outwardly of supporting member 2. Air enters the burner compartment 9 through the open front, rear and bottom thereof, whence a portion of the air admitted to the burner compartment 9 passes through the burners 13 and the remaining portion passes around the burners. The unused air and the combustion products are united at a point above the burners and thence move upwardly into the flue and out of the top of the heating unit.

The burner compartment 9 has diagonally and upwardly extending ceiling walls 16 which are preferably integral with side walls 12 and which terminate in a flue designated as 17. Flue 17 is formed by two vertically extending walls 18 which are integral with ceiling walls 16, by the upwardly extending portion 19 of a member 19b which closes in the upper rear portion of the burner compartment, and the upwardly extending portion 20 of a member 21 which closes in the upper front portion of the burner compartment 9.

Flue 17 is located intermediate of a chimney which is composed of two parts 22 and 23. Chimneys 22 and 23 are formed between walls 18 of flue 17 and vertically extending walls 24 which are integral at their lower ends with angularly inclined ceiling members 25 which merge with walls 6 of casing 1. Chimneys 22 and 23 are closed in at the rear by a portion of upwardly extending member 19 and at their front by a similar portion of upwardly extending member 20.

Ceiling members 16 of burner compartment 9 and ceiling members 25 form between them an expanded passageway designated as 26, the rear of which is closed by a member 32 which is integral with vertical member 19. The front of expanded passageways 26 is closed by an integral extension of plate 21 and vertical member 20. The construction is such that expanding passageways 26 are completely sealed from the burner compartment and from flue 17 and that chimneys 22 and 23 are likewise sealed from flue 17. As a result, fresh air entering at 15 can pass upwardly through passageways 32 at the sides of burner compartment 9 between said sides 12 and side wall 6 into expanded passageways 26 where it is slowed up in speed by reason of the expansion and is allowed to swirl into intimate contact with ceiling members 16 of burner compartment 9 and into intimate contact with the lower portions of walls 18 of the flue 17. The fresh air thus heated is then directed upwardly at increasing speed into chimneys 22 and 23 and thence issues out of the top of the casing 1 through grill 27.

Flue 17 is provided with staggered U-shaped fins 28 which are mounted on the walls 18 of the flue. Chimneys 22 and 23 are provided with fins 29 which are mounted on the outer face of walls 18 and project towards vertical walls 24. A baffle 30 is mounted above the central burner 13 and serves to cause the heated air issuing therefrom to be directed against the ceilings 16, preventing it from passing directly upwards into the flue 17. This baffle 30 is preferably mounted in any suitable manner on the lower ends of U-shaped members 28. Preferably, baffle 30 is not wider than the casing of central burner 13, as indicated in Figure 4, so that the draft of burner 13 will not be unduly diminished. Grill 27 is preferably of the same depth as burner compartment 9, but projects on each side of walls 24 as indicated in Figure 3. Thus tertiary fresh air entering at 15 may pass around back member 19 and front member 20 upwardly into corner passageways 31 and thence upwardly through grill 27. In the passage of this tertiary air, it is caused to contact the outer surfaces of walls 24, thereby extracting heat therefrom, and becoming expanded, and thence to issue upwardly at the ends of grill 27 whence it is adapted to commingle with air issuing from chimneys 22 and 23 from flue 17.

Humidifying means is provided within spaces 31 by attaching to walls 6 a pair of water tanks 34 to which easy access is provided through the front doors 8.

In the operation of the device, the burners 13 are lighted whereupon air is drawn in at 15 and through rear opening 11 and follows thence the paths indicated by the arrows on Figure 3. Primary air passes inwardly into the burner compartment 9 where part passes into the burners 13 aiding in combustion therein and part passes around these burners joining the heated air issuing from the burners above the same. The disposition of the burners and of baffle 30 is such that the heated air issuing from the burners is caused to impinge into intimate contact with ceilings 16 before passing up into the flue 17. The path of the heated air issuing from the burners is indicated by the wavy arrows in Figure 3 while the path of primary fresh air which has not passed through the burners is indicated by straight arrows. At the same time, secondary fresh air passes upwardly around the burner compartment 9 through passageways 32 into the expanding passageways 26 where it is brought into intimate contact with ceiling walls 16, both by reason of its swirling and by reason of its relatively low velocity brought about by the expansion due to the diverging of ceiling members 16 and 25. As the mixture of heated air and fresh air within burner compartment 9 passes upwardly through flue 17, it gives up considerable heat to U-shaped fins 28, each of which acts as a flue of its own. This heat is conducted to walls 18 and thence to outwardly extending fins 29. As the secondary fresh air in expanded compartments 26 is heated, it passes upwardly at an increased velocity through chimneys 22 and 23, in which it contacts fins 29 and abstracts heat therefrom, thereby still further adding to its velocity. The mixture of heated air and primary fresh air issuing from flue 17 commingles to a large extent with the heated air issuing from chimneys 22 and 23 and together these form a heated, relatively high speed current of air issuing upwardly from the unit.

At the same time as the action aforesaid is taking place, tertiary fresh air admitted at 11 and 15 circulates upwardly inside of the unit into the spaces 31, following the path of the arrows of Figure 3 and passing into intimate contact with walls 24 which are heated somewhat by the hot air inside. This air issues at the outer portions of grill 27 and is adapted to commingle with the heated air issuing from chimneys 22 and 23 and from flue 17 and to thence be dispersed into the room. Air in passing through space 31 travels over the water in the containers 34 on walls 6 and carries into the air streams at the top of the unit the humidification necessary to comfort in heated rooms.

Still further circulating effect is brought about by the device of this invention in the form of air passing upwardly on the outside of the unit as indicated by the arrows on the outside thereof in Figure 3, at the top being drawn inwardly by the inward blast and thence circulated into the room.

The U-shaped fins 28 in the flue 17 each act as an individual flue closed on all sides and aid greatly in keeping the velocity of the heated air from the burner compartment at a desired level, while effecting a very rapid transfer of heat therefrom to walls 18 and to fins 29. The straight fins 29 prevent eddying of the secondary air and keep its velocity up. As a result of this construction, a very strong draft is created within the fins where the greatest heat is being dissipated, thus heated air issues from the device at a relatively high speed and causes more rapid heating of the enclosure, better circulation within the enclosure, and a more uniform temperature throughout the enclosure. These results are greatly enhanced by reason of the expanded compartments 26 which cause swirling and very intimate contact of the secondary fresh air with the ceilings 16 of the burner compartment 9 and with the lower portion of flue walls 18. These compartments 26 then cause the heated secondary fresh air to move upwardly into chimneys 22 and 23 of relatively small size at an increasing velocity due to the combined effect of the converging of the path of the secondary fresh air and the heating of said air with consequent expansion in volume. The result is that the secondary fresh air passes through chimneys 22 and 23 at very high speed and issues from the top of the unit at a similar speed with resulting enhanced effectiveness in heating.

I wish it to be understood that I intend to include as within my invention such modifications as may be necessary to adapt the same to varying conditions and uses and as fall within the scope of the claims and the spirit of the invention.

Having thus fully described my invention, what I claim as new and desire to secure by Letters Patent is:

1. In a heater, an elongated burner compartment, burner means therein adapted to heat the ceiling wall thereof, an elongated flue leading upwardly from said burner compartment and arranged transversely thereupon, means forming an expanded passageway with said ceiling wall arranged longitudinally of said burner compartment, means forming a constricted passageway adjacent said flue transverse of said burner compartment and in communication with said expanded passageway, and means for admitting fresh air into said expanded passageway where it intimately contacts said ceiling wall of said burner compartment and passes longitudinally thereover into said constricted passageway at relatively higher speed.

2. In a heater, an elongated burner compartment, wall means forming an elongated flue arranged transversely of said compartment and extending upwardly therefrom, burner means in said burner compartment adapted to heat a ceiling wall of said burner compartment, means cooperating with said ceiling wall forming an expanded passageway arranged longitudinally of said burner compartment, means forming a constricted passageway adjacent said flue transverse of said burner compartment and in communication with said expanded passageway, fins mounted within said constricted passageway and extending into said expanded passageway, and means for admitting fresh air to said expanded passageway where it may concomitantly contact said ceiling wall and said fins and pass longitudinally over said ceiling walls into said constricted passageway in contact with said fins.

3. In a heater, a burner compartment, wall means forming a flue leading therefrom, burner means in said burner compartment adapted to heat a wall of said burner compartment, means cooperating with said wall of said burner compartment to form an expanded passageway, means cooperating with said flue wall forming a constricted passageway, fins arranged in said flue dividing same into a plurality of separate flues, fins in said constricted passageway extending into said expanded passageway, and means for admitting fresh air into said expanded passageway into intimate contact with said wall of said burner compartment and thence into said constricted passageway in intimate contact with said fins therein, said flue fins and said passageway fins maintaining eddyless flow of gases passing thereover.

4. In a heater, a burner compartment having a ceiling wall, wall means extending from said ceiling wall forming a flue leading therefrom, a plurality of burner means in said burner compartment, at least one of said burners being located in a position that the heated air rising therefrom will issue directly into said flue, baffle means in said burner compartment disposed between said flue and said one burner for causing the heat from said burner means to be deflected against said ceiling of said burner compartment, means forming with said ceiling wall of said burner compartment an expanded passageway, and means for admitting fresh air into said expanded passageway and thereby into intimate contact with said ceiling of said burner compartment.

5. In a heater, a horizontal elongated burner compartment, ceiling walls therefor extending inwardly from the ends thereof and upwardly at an angle of inclination towards the center thereof, flue wall means extending upwardly from the inward portions of said ceiling walls and forming a flue for said burner compartment, a plurality of burners in said burner compartment, one of which is located below said flue, baffle means over said burner located below said flue for directing the heated air rising from said burner onto said ceiling walls, separate ceiling walls located above said ceiling walls of said burner compartment and extending inwardly and upwardly at a steeper angle of inclination, thereby forming therewith a pair of expanded passageways, and means for admitting fresh air both to said burner compartment and to said expanded passageways.

6. In a heater, a horizontal elongated burner compartment, ceiling walls therefor extending inwardly from the ends thereof and upwardly at an angle of inclination towards the center thereof, flue wall means extending upwardly from the inward portions of said ceiling walls forming a flue for said burner compartment, a plurality of burners in said burner compartment, one of which is located below said flue, baffle means over said burner located below said flue for directing the heated air issuing from said burner onto said ceiling walls, separate ceiling walls located above said ceiling walls of said burner compartment and extending inwardly and upwardly at a steeper angle of inclination, thereby forming therewith a pair of expanded passageways, means forming with said flue wall means a pair of constricted vertical passageways in communication with said expanded passageways, and means for admitting fresh air both to said burner compartment and to said expanded passageways.

7. In a heater, an elongated horizontal burner compartment, a plurality of burners therein, ceiling walls extending inwardly and inclined upwardly from the outer ends thereof toward the longitudinal center of the compartment and adapted to be heated by said burners, flue forming walls extending upwardly and transversely of said compartment from inward portions of said ceiling walls to provide a flue for said burner compartment arranged at the longitudinal center thereof, a plurality of fins mounted in said flue upon said flue walls, separate ceiling walls located above said first-named ceiling walls extending inwardly and inclined upwardly at a steeper angle of inclination and forming a pair of longitudinally extending expanded passageways adjacent said ceiling walls, means cooperating with said flue walls forming a pair of upwardly extending constricted passageways in communication with said expanded passageways, a plurality of fins mounted on said flue walls and extending into said constricted passageways, and means for supplying fresh air both to said burner compartment and to said expanded passageways where it comes into intimate contact with the ceiling walls of said burner compartment and is thence directed upwardly through said constricted passageways.

8. In a heater, an elongated burner compartment having a ceiling wall inclined in a longitudinal direction, vertical flue means arranged transversely of said burner compartment, burner means in said burner compartment adapted to heat said ceiling wall thereof, a separate ceiling wall located above said ceiling wall of said burner compartment and forming therewith an upwardly expanded passageway inclined in the same longitudinal direction as said first mentioned wall, means extending vertically from the uppermost portion of said expanded passageway cooperating with said flue means to form a constricted passageway, and means for admitting fresh air to said burner compartment and to said expanded passageway said air entering said expanded passageway flowing over said burner compartment ceiling in a longitudinal direction and thence upwardly through said transversely positioned constricted passageway.

9. In combination, in a space heater, of a main casing having an open bottom and top, means therein forming a chimney communicating with said open bottom and said open top and having a restricted upper portion, said chimney including a front and rear wall vertically arranged and spaced from the front and back walls of said casing and end walls a portion of which is provided by the end walls of said casing and other portions of which are formed by an angularly inclined wall section and a vertical wall section; a burner compartment mounted within said chimney, a flue for said compartment extending upwardly through said chimney and having at least one of its upwardly extending walls in spaced relationship with respect to said chimney whereby air circulates on the outside of the chimney, the inside of the chimney and within the flue and passes upwardly through said casing and out the top thereof in substantially parallel streams.

10. In combination, in a space heater, of a main casing having an open bottom and top, means therein forming a chimney communicating with said open bottom and said open top and having a restricted upper portion, said chimney including a front and rear wall vertically arranged and spaced from the front and back walls of said casing and end walls a portion of which is provided by the end walls of said casing and other portions of which are formed by an angularly inclined wall section and a vertical wall section; a burner compartment mounted within said chimney, a flue for said compartment extending upwardly through said chimney and having at least one of its upwardly extending walls in spaced relationship with respect to said chimney whereby air circulates on the outside of the chimney, the inside of the chimney and within the flue and passes upwardly through said casing and out the top thereof in substantially parallel streams, means of restricting the passage of the air between the burner casing and the main casing, and means of guiding said air in an expanded area beyond said restricted area.

11. In combination, a main casing having an open bottom and top, a chimney compartment having front and back walls spaced inwardly from the front and back walls of the main casing and said chimney having side walls partially formed by the side walls of the main casing and partially formed by diagonal and vertical chimney portions; a burner casing mounted within said chimney having a flue extending upwardly within said chimney, a portion of said flue extending through said chimney in spaced relationship thereto, and means on the interior and exterior of said flue for guiding air currents and combustion products whereby one body of air passes through the burner casing and thence out the flue, another body of air passes between the burner casing and the interior of the chimney, and the third body of air passes between the outside of the chimney and the interior of the casing.

12. In a heater, a burner compartment comprising a housing member having a ceiling wall and arranged to support burner means therein, a flue extending upwardly from said housing, a cabinet housing having airflow openings in the top and bottom walls thereof, means for supporting said burner compartment in spaced relation with respect the walls of said cabinet housing, said flue extending adjacent the discharge opening in the top wall of said cabinet housing, wall means positioned within said cabinet housing cooperating with said burner housing ceiling wall to provide an expanding passageway through which air can circulate in contact with said burner housing and ceiling wall, and wall means positioned within said cabinet housing cooperating with said flue wall to provide a restricted passageway to conduct heated air from said expanded passageway to the discharge opening in the top wall of the cabinet housing.

13. In a heater, a burner compartment comprising a housing member having a ceiling wall and arranged to support burner means therein, a flue extending upwardly from said housing, a cabinet housing having airflow openings in the top and bottom walls thereof, means for supporting said burner compartment in spaced relation with respect the walls of said cabinet housing, said flue extending adjacent the discharge opening in the top wall of said cabinet housing, wall means positioned within said cabinet housing cooperating with said burner housing ceiling wall to provide an expanding passageway through which air can circulate in contact with said burner housing and ceiling wall, and baffle means positioned above said burner means to direct heat therefrom in intensified manner against said ceiling wall.

PAUL L. DULANEY.